(12) United States Patent
Osawa

(10) Patent No.: US 9,588,942 B2
(45) Date of Patent: Mar. 7, 2017

(54) INFORMATION PROCESSING APPARATUS AND INFORMATION PROCESSING METHOD

(71) Applicant: CANON KABUSHIKI KAISHA, Tokyo (JP)

(72) Inventor: Shunsuke Osawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 555 days.

(21) Appl. No.: 14/075,019

(22) Filed: Nov. 8, 2013

(65) Prior Publication Data
US 2014/0136934 A1  May 15, 2014

(30) Foreign Application Priority Data

Nov. 12, 2012 (JP) .................. 2012-248309

(51) Int. Cl.
  *G06F 17/22* (2006.01)
(52) U.S. Cl.
  CPC ................. *G06F 17/2229* (2013.01)
(58) Field of Classification Search
  CPC .......................................... G06F 17/2229
  USPC ....................................................... 715/202
  See application file for complete search history.

(56) References Cited

U.S. PATENT DOCUMENTS

| | | | | |
|---|---|---|---|---|
| 6,026,416 A * | 2/2000 | Kanerva | ........... | G06F 17/30011 707/E17.008 |
| 6,674,540 B1 * | 1/2004 | Wiechers | .............. | G06F 17/243 358/1.13 |
| 7,003,723 B1 * | 2/2006 | Kremer | ................... | G06Q 10/10 358/1.12 |
| 7,870,503 B1 * | 1/2011 | Levy | ..................... | G06F 9/4443 707/797 |
| 2003/0007013 A1 * | 1/2003 | Gatis | ....................... | G06F 17/21 715/853 |

(Continued)

FOREIGN PATENT DOCUMENTS

| | | |
|---|---|---|
| JP | 2001-75954 A | 3/2001 |
| JP | 2005-071187 A | 3/2005 |

(Continued)

OTHER PUBLICATIONS

Eriksson, Henrik. "The semantic-document approach to combining documents and ontologies." International journal of human-computer studies 65, No. 7 (2007): 624-639.*

*Primary Examiner* — Frank D Mills
(74) *Attorney, Agent, or Firm* — Canon USA, Inc. IP Division

(57) ABSTRACT

An image processing apparatus includes a reception unit configured to receive specification of a plurality of material electronic documents and an instruction on generation of an integrated electronic document based on the plurality of material electronic documents, a display unit configured to, when the reception unit receives the instruction, display on a display unit a setting screen for receiving setting on the generation of the integrated electronic document from the plurality of material electronic documents before the integrated electronic document is generated, and a generation unit configured to, based on the setting received via the setting screen, generate the integrated electronic document from the plurality of material electronic documents.

9 Claims, 20 Drawing Sheets

(56) References Cited

U.S. PATENT DOCUMENTS

| | | | | |
|---|---|---|---|---|
| 2004/0139389 A1* | 7/2004 | Sato | ................. | G06F 17/24 |
| | | | | 715/255 |
| 2004/0267595 A1* | 12/2004 | Woodings | .............. | G06Q 10/06 |
| | | | | 705/7.14 |
| 2005/0190405 A1* | 9/2005 | Tomita | ................. | G06F 3/1206 |
| | | | | 358/1.18 |
| 2005/0246631 A1* | 11/2005 | Mori | .................... | G06F 17/211 |
| | | | | 715/209 |
| 2006/0238795 A1* | 10/2006 | Van Hoof | ............... | G06F 17/24 |
| | | | | 358/1.14 |
| 2007/0079227 A1* | 4/2007 | Singh | ................... | G06F 17/211 |
| | | | | 715/209 |
| 2007/0113164 A1* | 5/2007 | Hansen | ................ | G06Q 10/10 |
| | | | | 715/209 |
| 2011/0145733 A1* | 6/2011 | Neitz | .................... | G06F 3/0486 |
| | | | | 715/761 |
| 2011/0296291 A1* | 12/2011 | Melkinov | ........... | G06F 17/2229 |
| | | | | 715/229 |

FOREIGN PATENT DOCUMENTS

| | | |
|---|---|---|
| JP | 2008-052344 A | 3/2008 |
| JP | 2012-008880 A | 1/2012 |
| JP | 2012-216147 A | 11/2012 |

\* cited by examiner

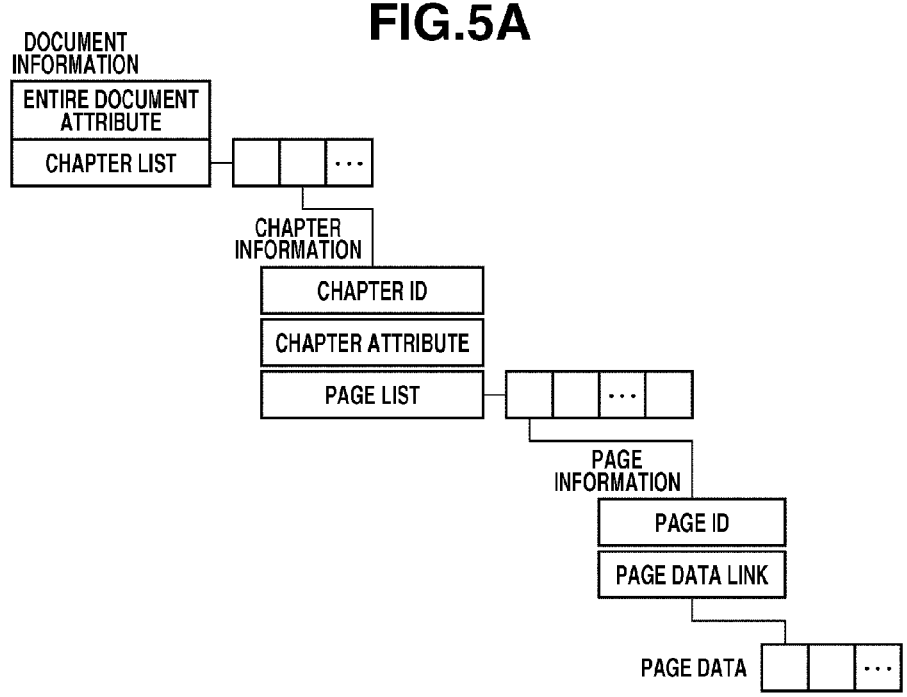

ENTIRE DOCUMENT ATTRIBUTE

| SETTING ITEM | SETTING CONTENT |
|---|---|
| OUTPUT SHEET SIZE | A3, A4, A5, B4, B5, LETTER, LEDGER, LEGAL, ... |
| OUTPUT SHEET ORIENTATION | SHORT EDGE FEED, LONG EDGE FEED |
| PAGE AGGREGATE SETTING | 1 in 1, 2 in 1, 4 in 1, 6 in 1, 8 in 1, 9 in 1, 16 in 1 |
| TWO-SIDED PRINTING/ONE-SIDED PRINTING | TWO-SIDED, ONE-SIDED |
| COLOR MODE | COLOR, MONOCHROME |

FIG.5C

CHAPTER ATTRIBUTE

| SETTING ITEM | SETTING CONTENT |
|---|---|
| CHAPTER-SPECIFIC SETTING FLAG | ON, OFF |
| OUTPUT SHEET SIZE | A3, A4, A5, B4, B5, LETTER, LEDGER, LEGAL, ... |
| OUTPUT SHEET ORIENTATION | SHORT EDGE FEED, LONG EDGE FEED |
| PAGE AGGREGATE SETTING | 1 in 1, 2 in 1, 4 in 1, 6 in 1, 8 in 1, 9 in 1, 16 in 1 |
| TWO-SIDED PRINTING/ONE-SIDED PRINTING | TWO-SIDED, ONE-SIDED |
| COLOR MODE | COLOR, MONOCHROME |

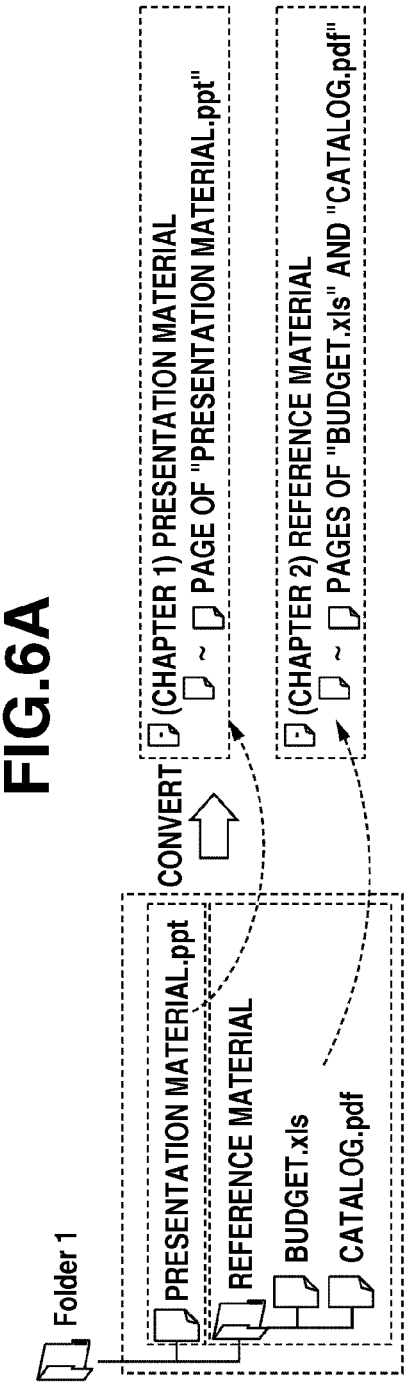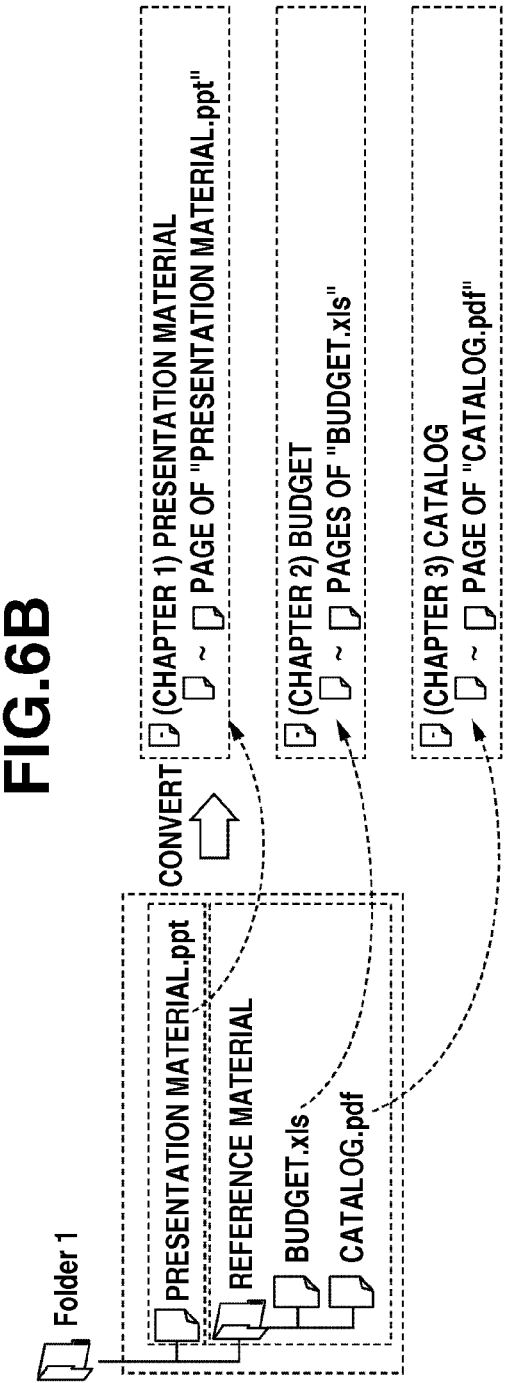

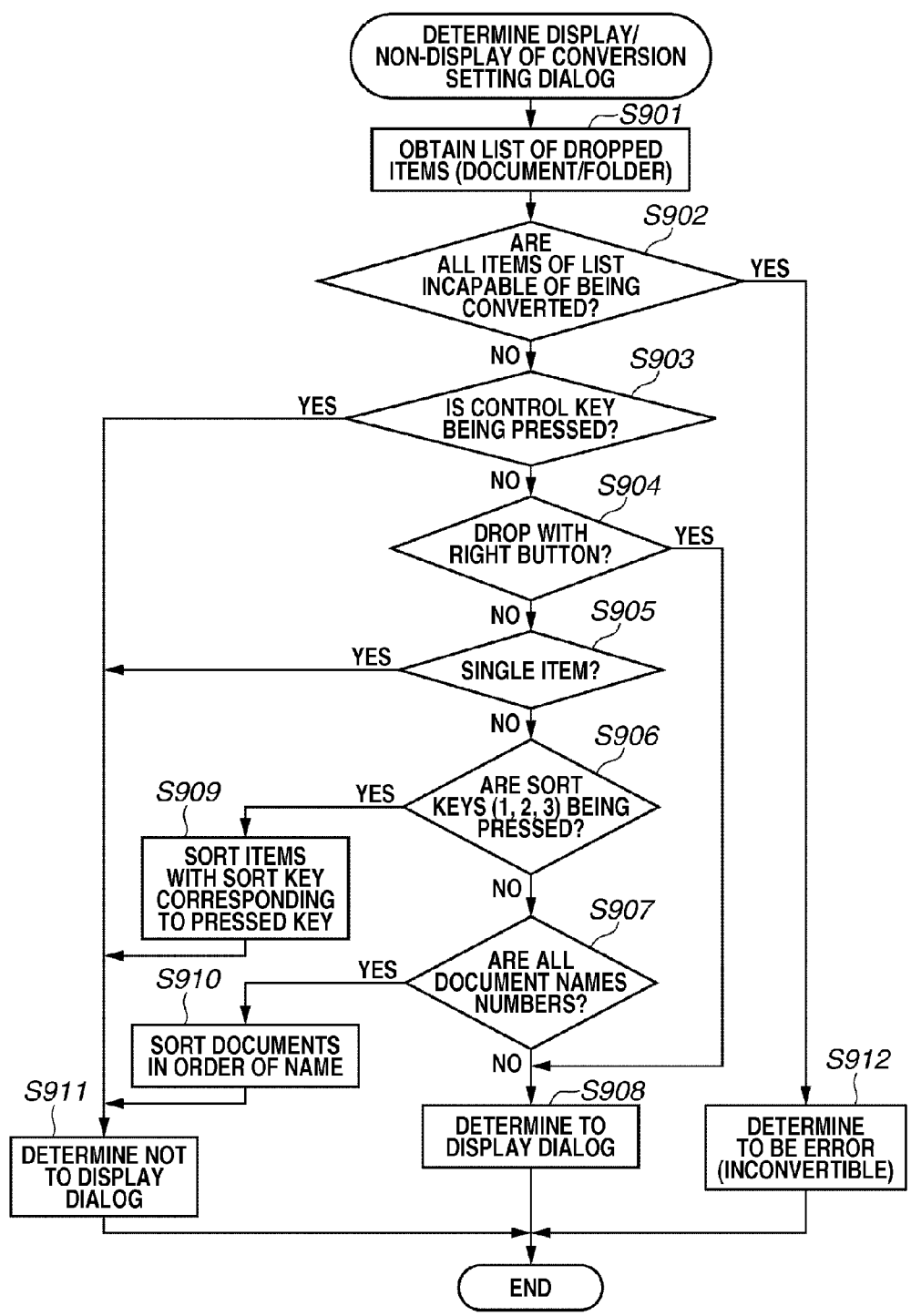

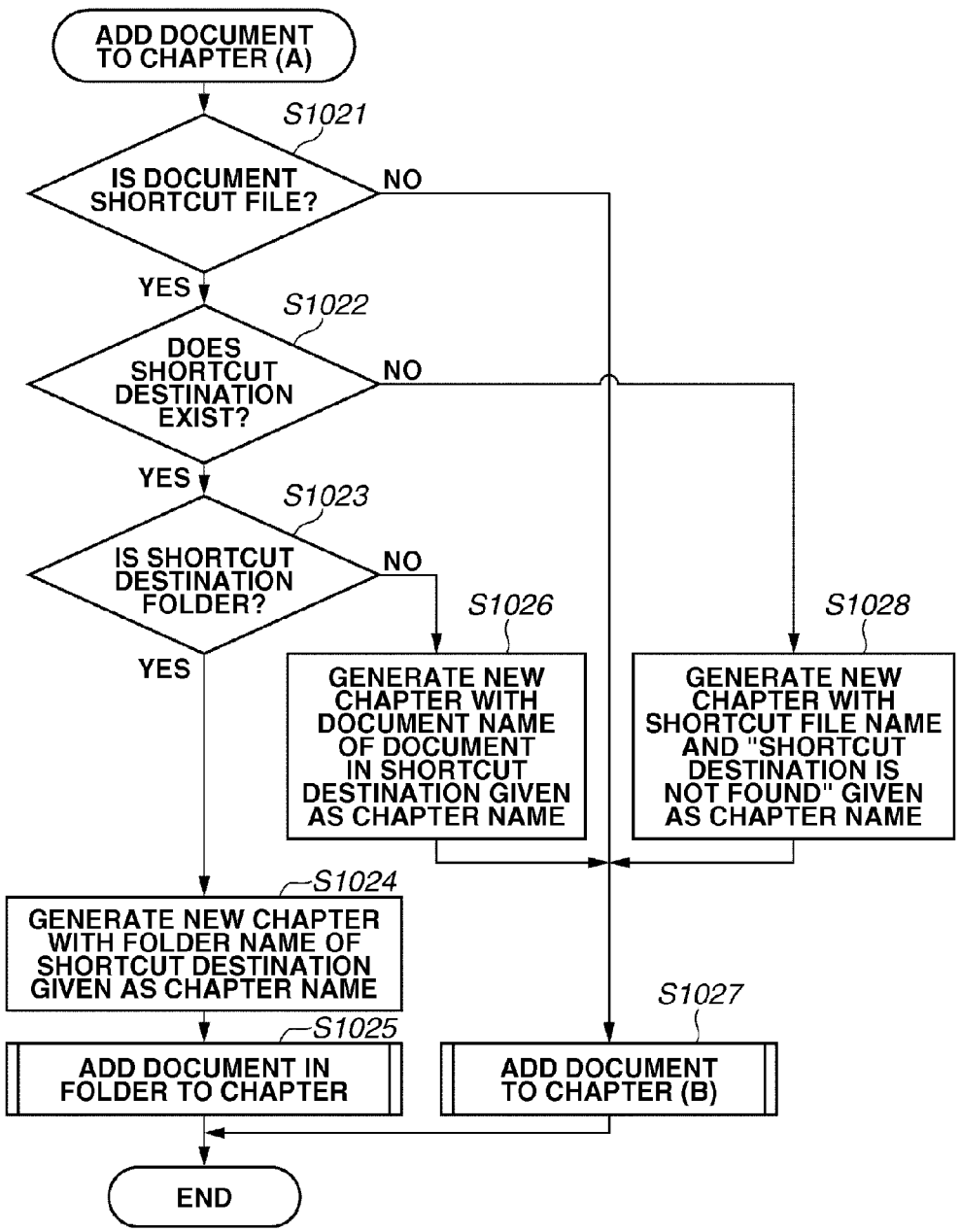

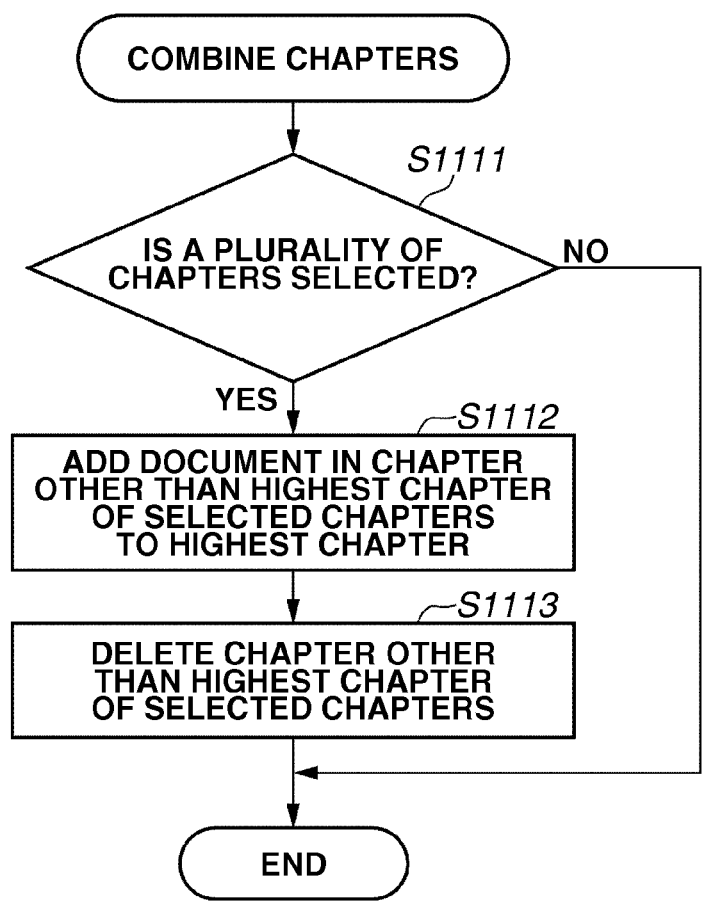

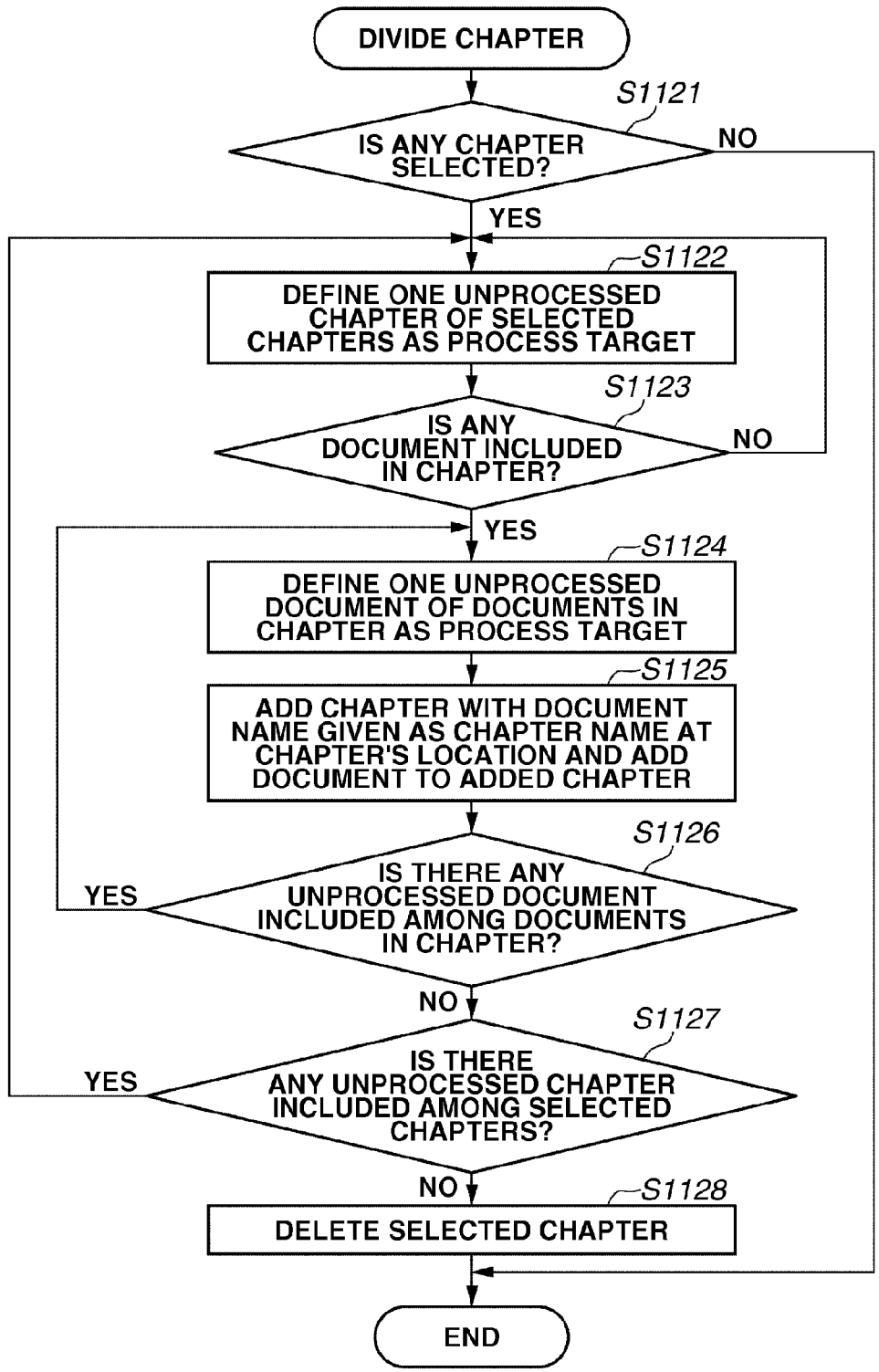

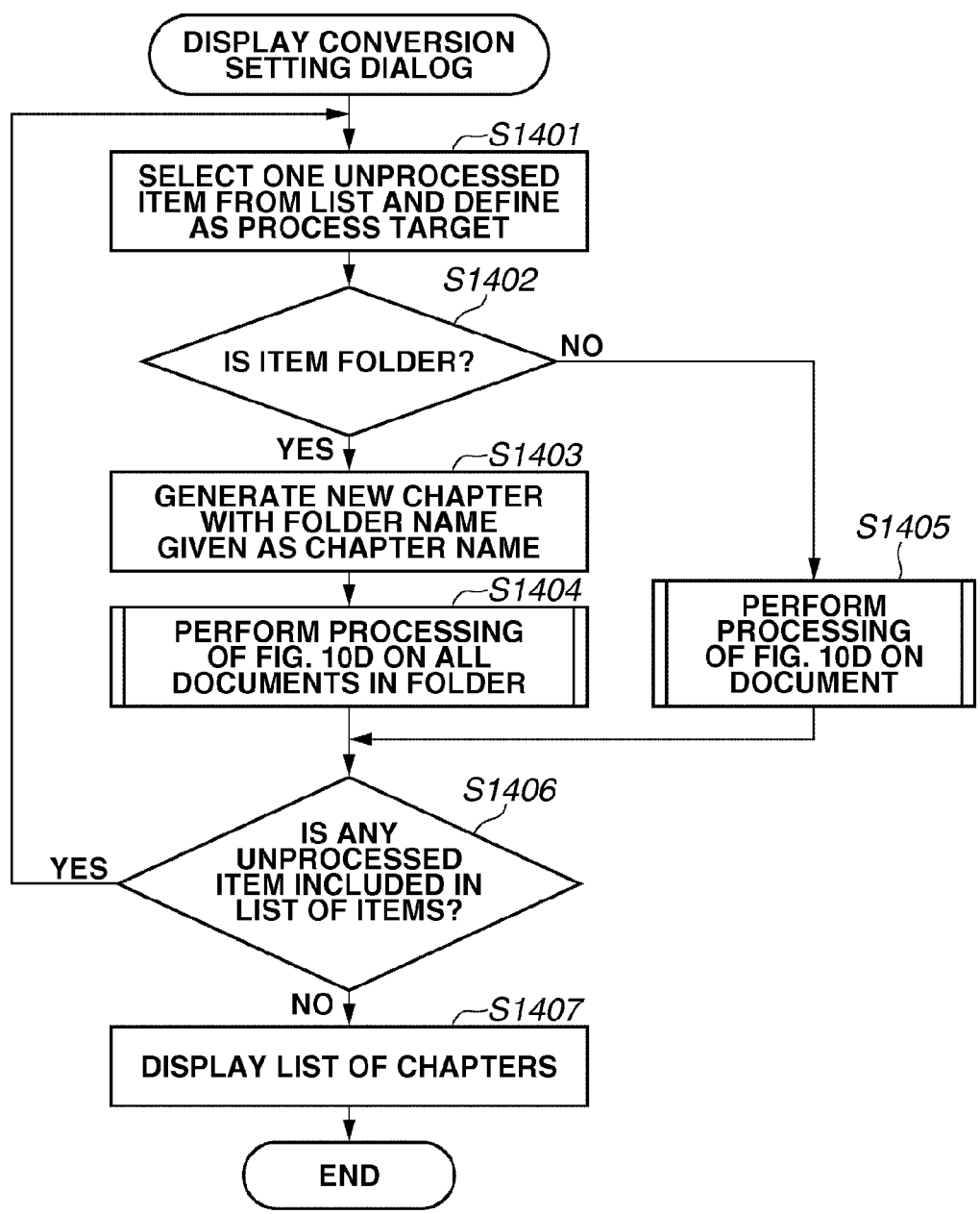

INFORMATION PROCESSING APPARATUS AND INFORMATION PROCESSING METHOD

BACKGROUND

Technical Field

The present disclosure relates to an information processing apparatus generating an integrated electronic document from a plurality of material electronic documents.

Description of the Related Art

Some companies have been adopting a document management system to promote reuse of documents.

A product in early times scanned a paper document via a scanner to register and store it. In recent years, many electronic documents have been generated by personal computers (PC), and registered and stored thereby. Further, these days, an arbitrary page can be extracted from among a plurality of registered electronic documents and bound like a binder to generate one electronic document, which is referred to as an "electronic binder". The electronic binder can manage a specified page group as a chapter and move and copy the page group by the chapter or in a page unit.

Conventionally, to realize such an electronic binder, a plurality of electronic documents is once converted into an integrated electronic document format, and then the converted electronic document is edited to configure a desirably generated electronic document.

Japanese Patent Application Laid-Open No. 2001-75954 discusses a method for converting a plurality of electronic documents into an integrated electronic document format, for example, a method for displaying an icon representing an electronic binder generation application via a screen and, when the electronic document is dragged and dropped on the icon, performing the conversion processing. When a file is dragged and dropped on the icon, a chapter is generated with a file name given as a chapter name, and then each page of the file is added to the chapter. When a folder is dragged and dropped on the icon, a chapter is generated with a folder name given as the chapter name, and then each page of the file in the folder is added to the chapter.

The conversion method discussed in Japanese Patent Application Laid-Open No. 2001-75954 automatically performs the conversion processing when the file or the folder is dragged and dropped on the icon. A user edits the converted electronic document to configure a desirably generated electronic document. However, if the conversion is once performed, the file is expanded into pages. Thus, when the page is moved or copied in an original file unit or a layer structure of the chapter (combining or dividing chapters) is set, the user needs to check the pages to confirm segment of the original file so as to select the page and perform an operation. If the file is formed of a plurality of pages, the operation becomes complicated, thereby deteriorating operability.

SUMMARY

The present disclosure is directed to an information processing apparatus capable of improving user's operability when an integrated electronic document is generated from a plurality of material electronic documents.

According to an aspect of the present invention, an information processing apparatus includes a reception unit configured to receive specification of a plurality of material electronic documents and an instruction on generation of an integrated electronic document based on the plurality of material electronic documents, a display unit configured to, when the reception unit receives the instruction, display on a display unit a setting screen for receiving setting on the generation of the integrated electronic document from the plurality of material electronic documents before the integrated electronic document is generated, and a generation unit configured to, based on the setting received via the setting screen, generate the integrated electronic document from the plurality of material electronic documents.

According to an exemplary embodiment of the present invention, user's operability when the integrated electronic document is generated from the plurality of material electronic documents can be improved.

Further features of the present invention will become apparent from the following description of exemplary embodiments with reference to the attached drawings.

BRIEF DESCRIPTION OF THE DRAWINGS

FIGS. 5A, 5B, and 5C are schematic diagrams illustrating a structure of document data and content of attribute information.

FIGS. 6A and 6B illustrate examples when a plurality of electronic documents is converted into an electronic binder.

FIG. 9 illustrates a determination processing flow of display/non-display of a conversion setting dialog.

FIGS. 10A, 10B, 10C, and 10D illustrate display processing flows of the conversion setting dialog.

FIGS. 11A, 11B, 11C, and 11D illustrate processing flows when conversion setting is changed via the conversion setting dialog.

FIG. 14 illustrates a display processing flow of the conversion setting dialog according to a second exemplary embodiment.

DESCRIPTION OF THE EMBODIMENTS

Various exemplary embodiments, features, and aspects of the invention will be described in detail below with reference to the drawings.

[System Configuration]

Figure 1:
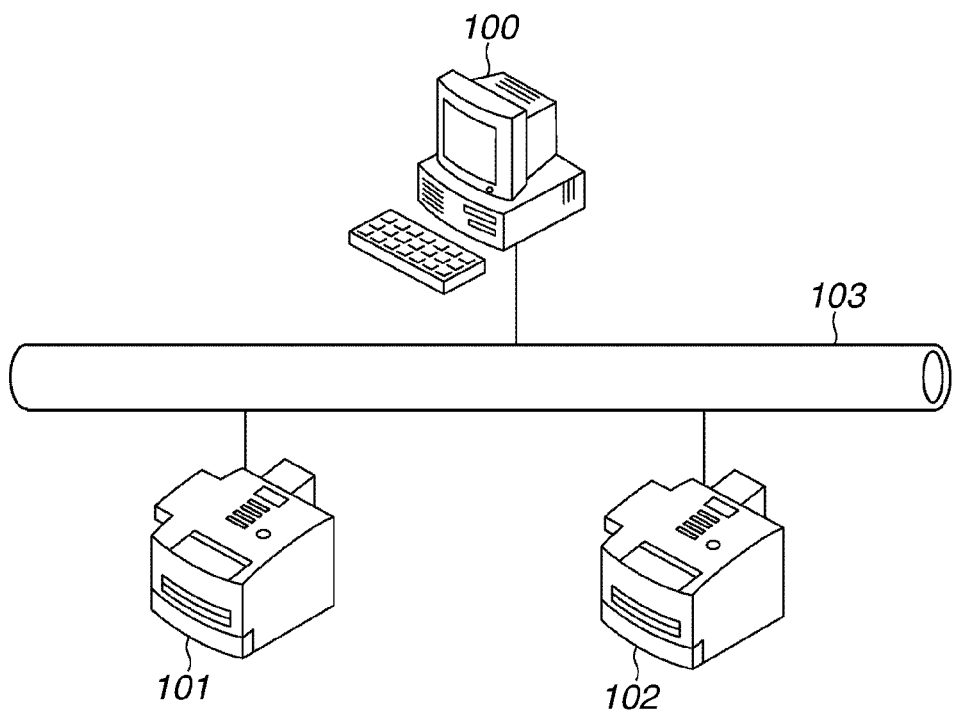
FIG. 1 illustrates a configuration of a system.

FIG. 1 illustrates a configuration of a data processing system according to a first exemplary embodiment of the present invention. The present exemplary embodiment relates to a system in which an information processing apparatus and an image processing apparatus can communicate with each other via a network. FIG. 1 illustrates an information processing apparatus 100, which is a computer used by a user instructing image processing apparatuses 101 and 102 to perform printing and fax transmission. The image forming apparatuses 101 and 102 are multifunction peripherals, and have a printer function, a fax function, a copy function, a scanner function, and a file transmission function. A predetermined operating system (OS) is installed in the information processing apparatus 100 and, further, various types of applications for performing specific function processing are also installed therein. The specific function processing includes document processing, table calculation processing, presentation processing, image processing, and figure processing. Each application includes a specific data structure (file structure). Further, the OS can give print instruction to a corresponding application with reference to an identifier of each file. Furthermore, an electronic binder application is installed in the information processing apparatus 100 according to the present exemplary embodiment. The electronic binder application has a function for converting a plurality of electronic documents in different types into an integrated electronic document format.

A local area network (LAN) 103 is connected with the above-described apparatuses, and the above-described apparatuses mutually exchange information via the LAN 103.

[Hardware Configuration (Information Processing Apparatus)]

Figure 2:
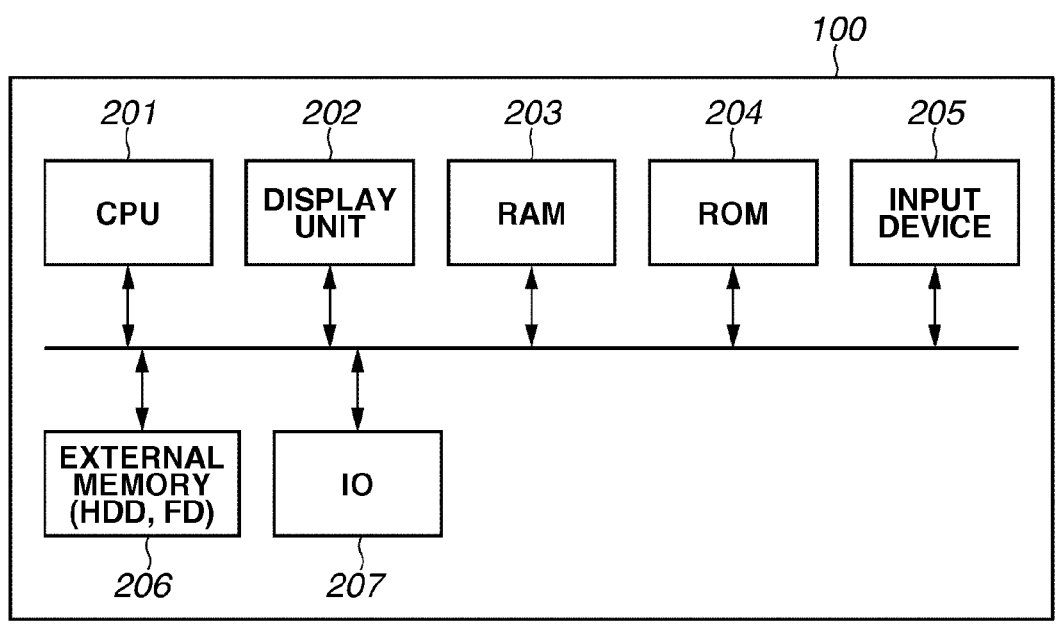
FIG. 2 illustrates a hardware configuration of an information processing apparatus.

FIG. 2 illustrates a hardware configuration of the information processing apparatus 100 illustrated in FIG. 1. As illustrated in FIG. 2, an input device 205 for receiving a user operation input such as a keyboard and a pointing device is provided. Further, a display unit 202 for providing visual output information feedback to the user is provided. Furthermore, an external memory 206 as a computer-readable storage medium including a storage device random access memory (RAM) 203, a hard disk drive (HDD), and a flexible disk drive (FDD) for storing various types of programs and execution information according to the present exemplary embodiment, and a read only memory (ROM) 204 are provided. Moreover, an interface device input/output (I/O) 207 for communicating with an external device and a central processing unit (CPU) 201 for reading and executing various types of programs stored in the external memory 206 and the ROM 204 is provided. A connection form with peripheral devices may be wired or wireless. The information processing apparatus 100 connects with the information processing apparatuses 101 or 102 via an external device connection interface (I/F).

[Hardware Configuration (Image Processing Apparatus)]

Figure 3:
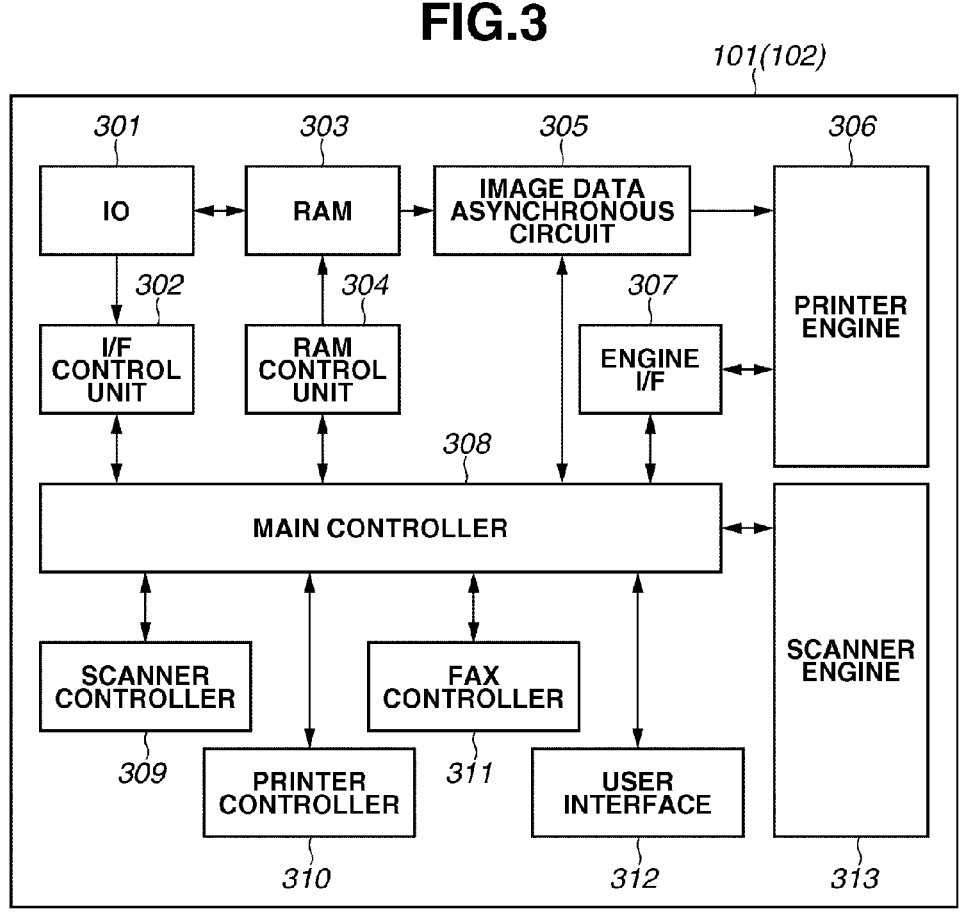
FIG. 3 illustrates a hardware configuration of an image processing apparatus.

FIG. 3 is a block diagram illustrating a hardware configuration in the image processing apparatuses 101 and 102 illustrated in FIG. 1. The present exemplary embodiment illustrates an example of a multifunction peripheral (MFP) having the scanner function, the printer function, and the fax function. As illustrated in FIG. 3, an I/O 301 is connected with the information processing apparatus 100 via a communication medium such as a network LAN 104. A plurality of I/Os 301 may be mounted to correspond to a plurality of connection forms. Via the I/O 301, the image processing apparatus 101 or 102 transmits a device identification (ID) or a scan image to the information processing apparatus 100. Further, the image processing apparatus 101 or 102 receives various types of control commands from the information processing apparatus 100, and then performs processing. An I/F control unit 302 controls issuance of the device ID for a processing system including a scanner, a printer, and a fax mounted in the image processing apparatus 101 or 102. A random access memory (RAM) 303 is a primary storage device, and used to store external data including a control command obtained by the I/O 301 and images read by a scanner engine 313. Further, the RAM 303 is used to store the images before the images are transmitted to a printer engine 306 expanded by a printer controller 310. Allocation and management of the RAM 303 are performed by a RAM control unit 304. An image data asynchronous circuit 305 outputs the image that is scanned by the printer controller 310 and the scanner engine 313 and expanded by the RAM control unit 304 along with rotation of the printer engine 306. The printer engine 306 develops the image onto an output media such as paper. A main controller 308 performs various types of control of the printer engine 306 via an engine I/F 307. Further, the main controller 308 is an essential module of the control, and performs appropriate sorting processing on control language received by the scanner controller 309, the printer controller 310, and the fax controller 311 from the information processing apparatus 100 via the I/O 301. The main controller 308 is supported by the controller and user interface 312 to control the printer engine 306 and the scanner engine 313. Control interfaces between the main controller 308 and each of various types of controllers are unified so that an extension board that can process a plurality of types of control commands can be mounted in one peripheral device. Further, the main controller 308 obtains from each controller a device ID of an extension controller currently mounted and manage it. The scanner controller 309 analyzes a scan control command received from the information processing apparatus 100 into an internal execution order that can be interpreted by the main controller 308. Further, the scanner controller 309 changes the image read by the scanner engine 313 into the scan control command. The printer controller 310 analyzes a page description language received from the information processing apparatus 100 into the internal execution order including an expanded image of the page description language that can be interpreted by the main controller 308. The expanded image is carried to the printer engine and printed onto the output media such as a sheet. The fax controller 311 expands a fax control language received from the information processing apparatus 100 into the image and transfers the image to another fax device or internet protocol (IP)-fax via a public line (not illustrated) or an internet. When various types of settings of the main controller 308, the scanner function, the printer function, and the fax function are performed by the image processing apparatus 101 or 102, the user interface 312 is used as an input/output unit instructed by the user. The scanner engine 313 reads the image printed using an optical device according to the instruction by the main controller 308, converts the image into an electric signal, and then transmits the electric signal to the main controller 308.

[Software Configuration Diagram]

Figure 4:
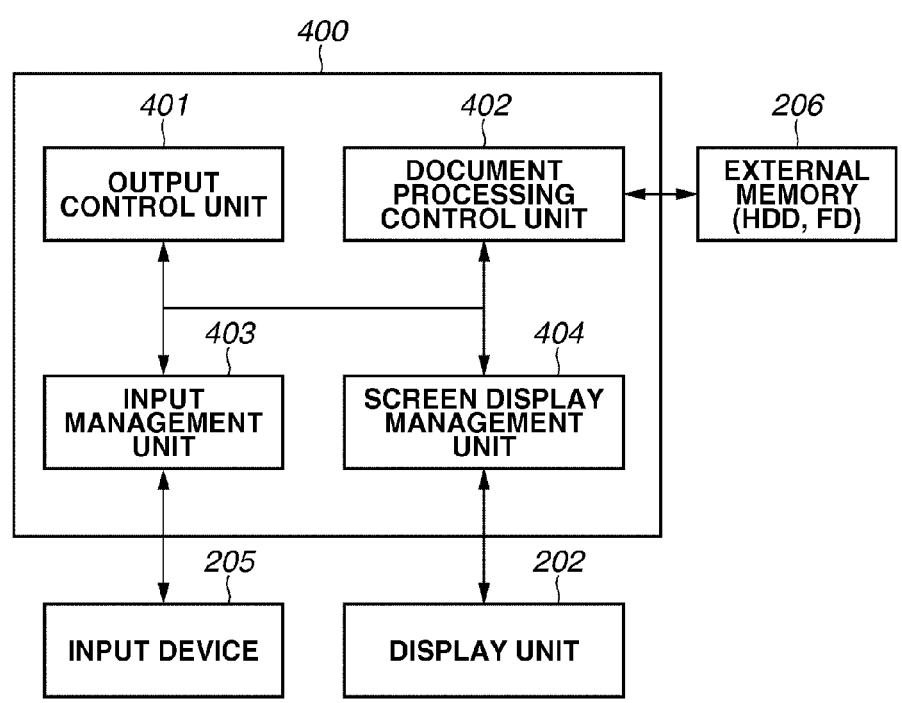
FIG. 4 illustrates a software configuration of an electronic binder application.
Figure 7:
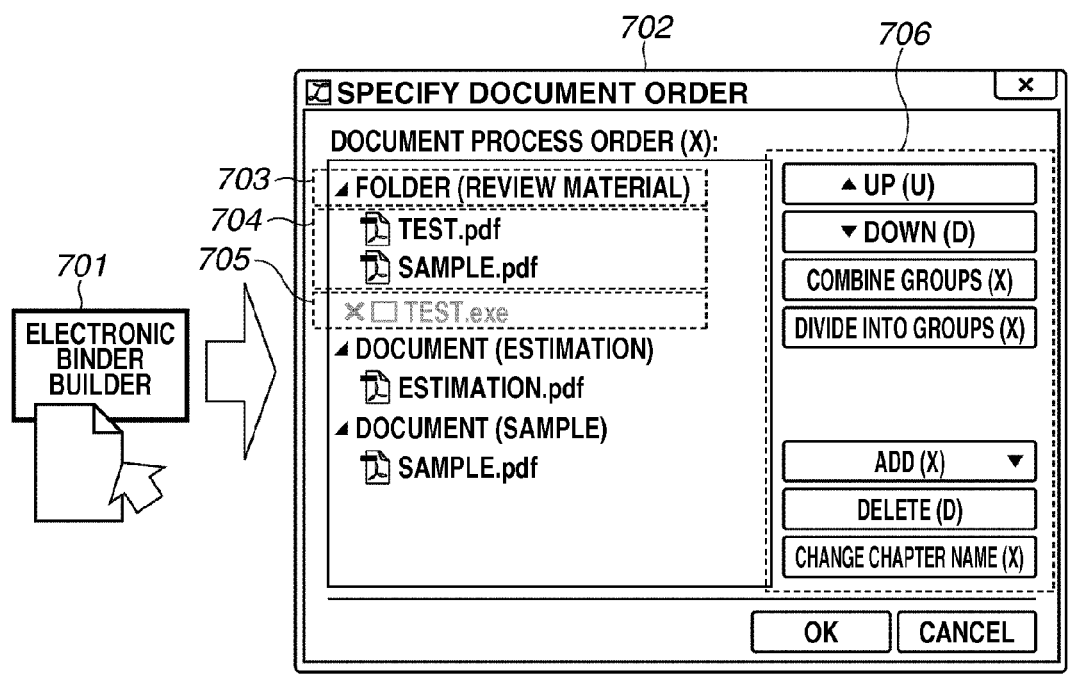
FIG. 7 illustrates an example of a user interface (UI) display when a plurality of electronic documents is dragged and dropped on an icon representing an electronic binder application.

FIG. 4 illustrates an example of a function configuration of an electronic binder application 400 included in the information processing apparatus 100. The electronic binder application 400 includes an output control unit 401, a document processing control unit 402, an input management unit 403, and a screen display management unit 404. The input management unit 403 detects a user's operation of the input device 205 via a graphical user interface (GUI) of the electronic binder application 400 displayed by the screen display management unit 404, and obtains information about the user's operation. As the GUI of the electronic binder application 400, the screen display management unit 404 controls a screen display such as a display of the icon of the electronic binder application 400 as illustrated in FIG. 7 indicated as one example. The output control unit 401 gives an output instruction to the image processing apparatus 101 or 102. More specifically, the output control unit 401 receives the output instruction from the user via the input management unit 403 and, based on the output instruction, gives the output instruction to the printer driver allocated to a corresponding printer object. When printing is instructed, the output instruction is given to the printer driver for printing, and when fax transmission is instructed, the output instruction is given to the printer driver for fax transmission. The printer driver that has received the instruction converts the document file specified by the output instruction into output instruction information that can be interpreted by the image processing apparatus 101 or 102. The output instruction information herein refers to, when print output is instructed, conversion into a print data format (e.g., page description language (PDF)). The printer driver transmits the converted print instruction information to the image processing apparatus 101 or 102 via the network 103. The document processing control unit 402 controls processing on the document such as processing for converting a plurality of different electronic documents into an integrated electronic document format. More specifically, upon receiving a document conversion instruction from the user via the input management unit 403, the document processing control unit 402 performs conversion processing based on the conversion instruction. Further, the document processing control unit 402 controls reading of the electronic document before being converted from the external memory 206, and writing of the converted electronic document into the external memory 206. Hereinafter, the integrated electronic document in the integrated electronic document format is described as an electronic binder.

[Configuration of Electronic Binder and Content of Attribute Information]

FIGS. 5A, 5B, and 5C schematically illustrate examples of a data structure and content of attribute information of the electronic binder. FIG. 5A illustrates a data structure of the electronic binder as a tree structure including three layers of a document, a chapter, and a page. One document includes an entire document attribute and a chapter list. Each chapter list retains a link to information about a plurality of chapters. The chapter information includes a chapter ID, chapter attribute, and a page list. The page list retains a link to information about a plurality of pages. Each page information includes a page ID and a page data link. The page data link retains a link to substantial data of the page data. FIGS. 5B and 5C are lists illustrating examples of the entire document attribute and the chapter attribute. A parameter set for the entire document attribute is valid all through the document. On the other hand, the parameter set for the chapter attribute is valid only for the chapter. Even when the chapter attribute overlaps the entire document attribute, the chapter attribute has priority. When the chapter attribute has the chapter-specific attribute, a chapter-specific setting flag is set to on, and the parameter specific to the chapter is set for each setting item. When the chapter attribute has no chapter-specific attribute, the chapter-specific setting flag is set to off, and null is set for each setting item.

[Conversion Example from Electronic Documents into Electronic Binder]

FIGS. 6A and 6B illustrate examples in which a plurality of electronic documents (material electronic document) as material is converted into the electronic binder (integrated electronic document). This conversion shows an example of processing performed, when the user selects a "presentation material.ppt" and a "reference material" folder as the material electronic document, to instruct the conversion into the electronic binder. The electronic documents to be converted are "presentation material.ppt", and "budget.xls" and "catalog.pdf" in a "reference material" folder. A conversion method is different depending on whether the document to be converted is located in the selected folder.

FIG. 6A illustrates an example of conversion with information about the folder reflected to the electronic binder. Each page of "presentation material.ppt" is added into the chapter having a document name of "presentation material" (except for an extension portion) as the chapter name. On the other hand, each page of "budget.xls" and "catalog.pdf" in the "reference material" folder is added to the chapter having the folder name of "presentation material" as the chapter name. At a point of time when the document has been converted, which page comes from which material electronic document in the "reference material" chapter cannot be told. In other words, whether the page comes from "budget.xls" or "catalog.pdf" cannot be told.

FIG. 6B illustrates an example of conversion without information about the folder reflected to the electronic binder. "Presentation material.ppt" is converted in a similar manner to FIG. 6A. Each page of "budget.xls" and "catalog.pdf" in the "reference material" folder is added to the chapter having the document name of "presentation material" and "catalog" as the chapter name respectively in a similar manner to "presentation material.ppt".

According to the present exemplary embodiment, whether to perform the conversion with the folder information reflected to the electronic binder can be switched by a setting file stored in the external memory 206. Subsequent processing when the conversion is performed with the folder information reflected to the electronic binder will be described.

[UI Example for Setting Conversion]

FIG. 7 schematically illustrates a UI screen displayed when the user drags and drops the electronic document on the icon representing an electronic binder builder application. When the user drags and drops the electronic document on an icon 701 representing the electronic binder builder application, a dialog 702 for setting the conversion is displayed. This dialog will be described as a "conversion setting dialog" hereinafter. In the conversion setting dialog 702, the information about the dropped items 703, 704, and 705) is displayed. Displaying the conversion setting dialog 702 each time the item is dragged and dropped is cumbersome. Thus, whether the conversion setting dialog 702 needs to be displayed is automatically determined, and it is displayed only when necessary. A determination method will be described below. A "review material" folder 703 stores the documents 704, which are a "test.pdf" document and a "sample.pdf" document. "Test.exe" 705 is stored in the "review material" folder. According to the present exemplary embodiment, the file of an "exe" format cannot be converted into the electronic binder, and thus a "x" mark indicating that the file cannot be converted is displayed at the left of the icon of the file. A method of a display for warning that the folder cannot be converted is not limited to the method for displaying the "X" mark. For example, a method for changing a color of a portion displaying the file name or for displaying the file name with a strike-through may be used. A control group 706 changes the setting of the conversion. The user performs operation via the control group 706 to set the conversion method for changing an order of the documents in an original file unit, or combining the plurality of documents into the same chapter. Further, the document and the folder are dragged and dropped on the conversion setting dialog 702 to add the document or the folder to the chapter. When the user presses an OK button, the electronic document is converted by the set conversion method to generate the electronic binder.

[Processing Flow when Electronic Documents are Converted into Electronic Binder]

Figure 8:
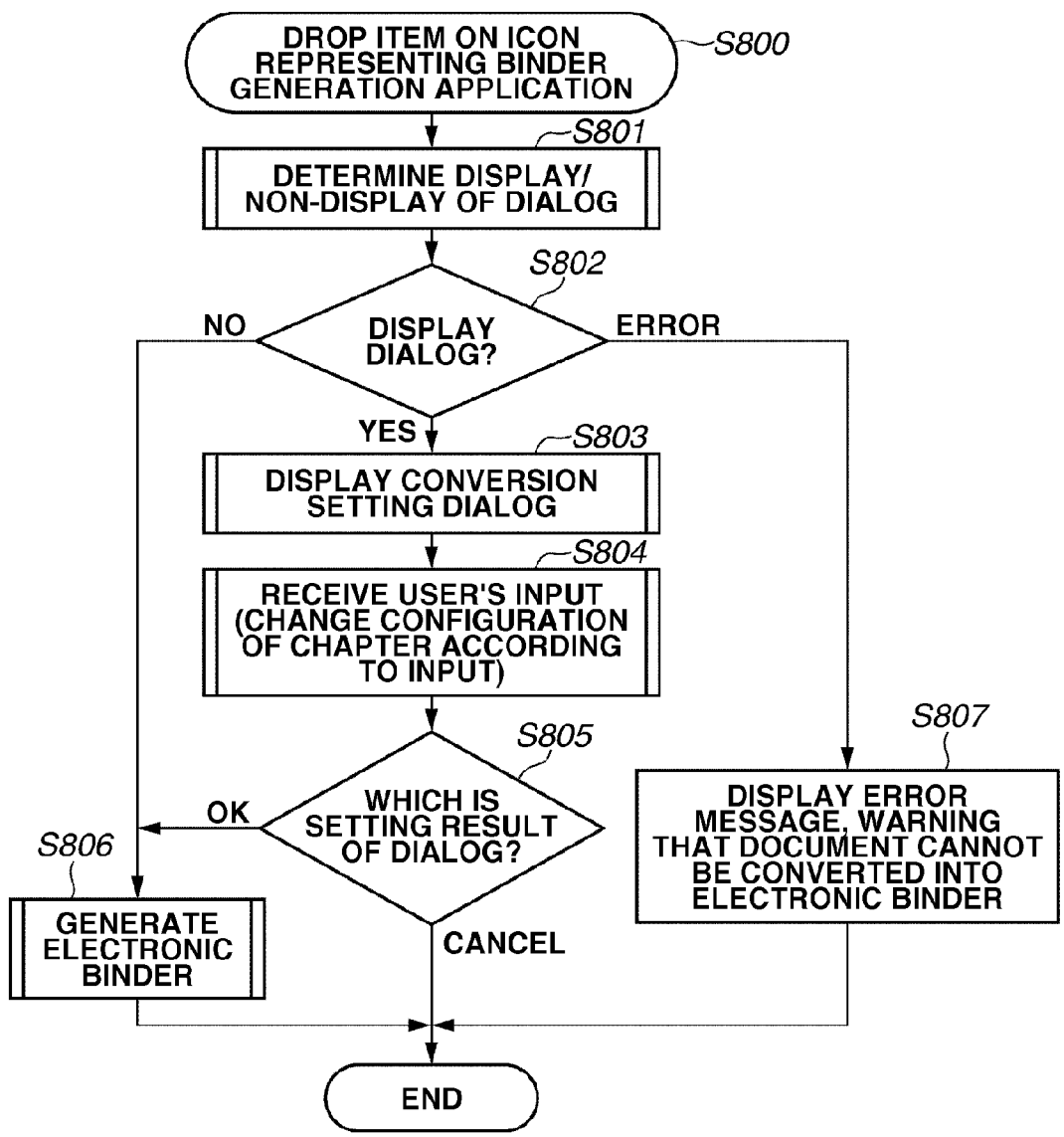
FIG. 8 illustrates a processing flow when an item is dropped on an icon representing a binder generation application.

FIG. 8 illustrates a processing flow when the electronic binder application 400 converts a plurality of electronic documents into an electronic binder. Steps S800 to S807 can be realized when the CPU 201 loads a program of the electronic binder application 400 stored in the ROM 204 or the external memory 206 into the RAM 203 and executes it.

In step S800, the document processing control unit 402 detects a drop action in which the item such as the plurality of folders and the plurality of files are dropped on the icon 701 representing the electronic binder builder application 400. Detecting the dropped file and the file included in the dropped folder corresponds to receiving specification of the material electronic document. Detecting the drop action corresponds to receiving the instruction of generating a single electronic binder from the material electronic documents. When the folder is dropped, the plurality of files included in the folder is determined to be the material electronic document.

Figure 10A:
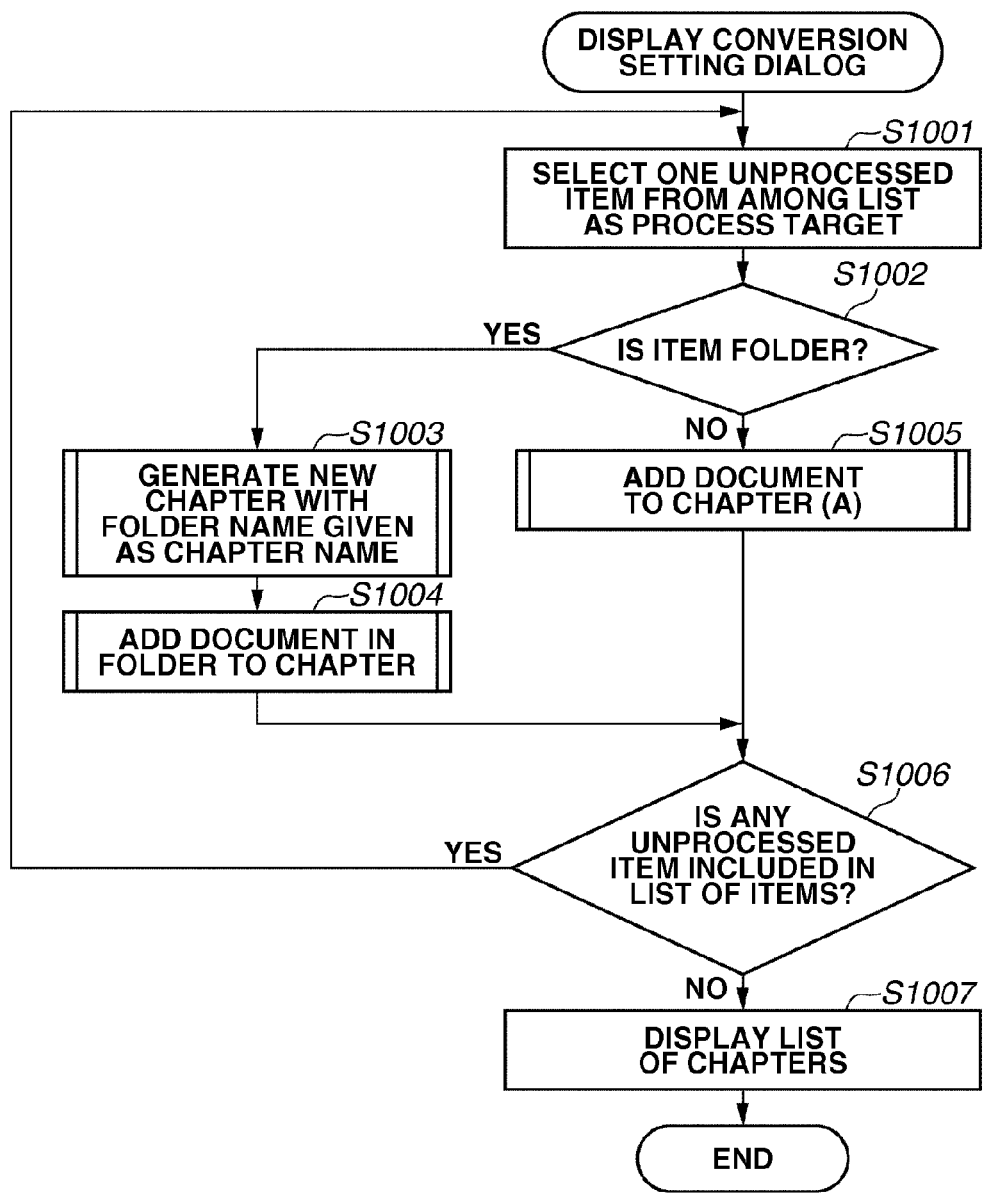
Figure 10B:
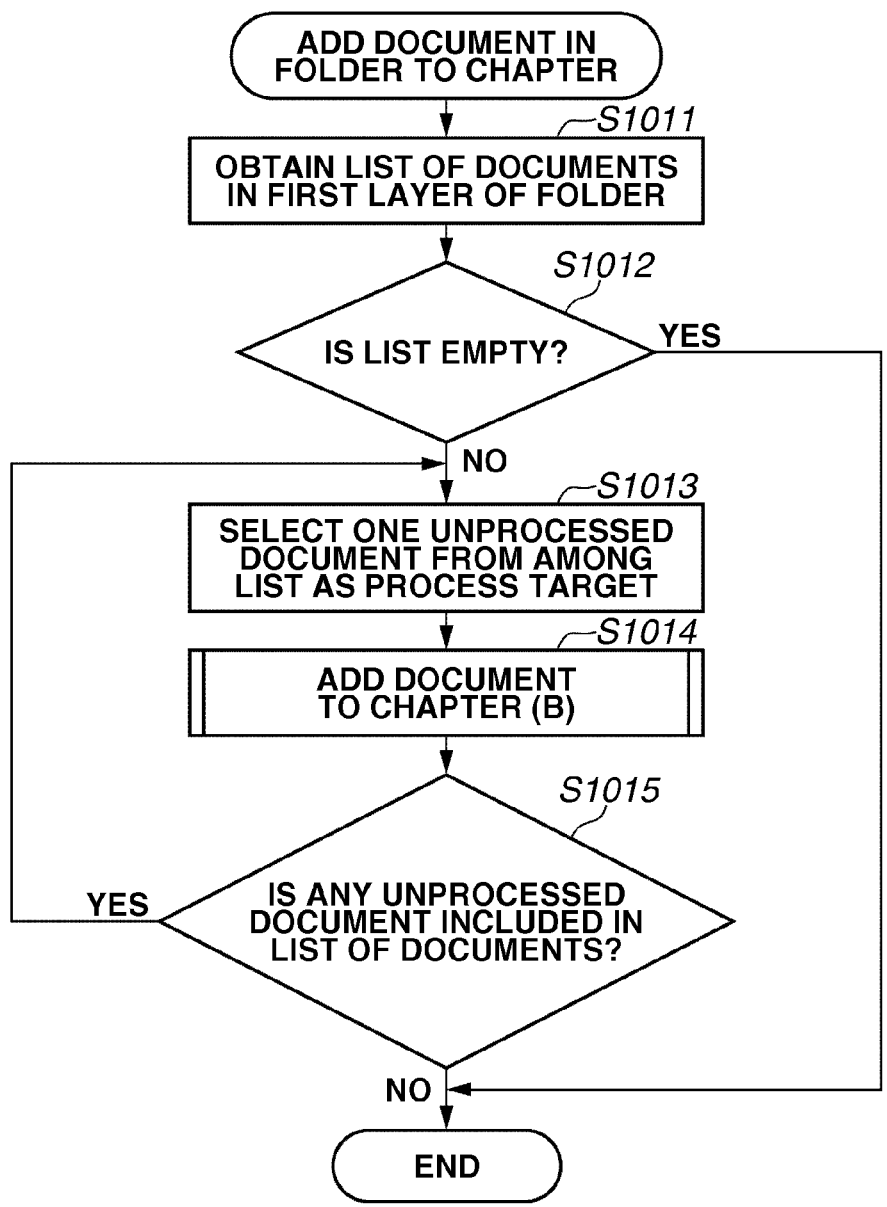
Figure 10D:
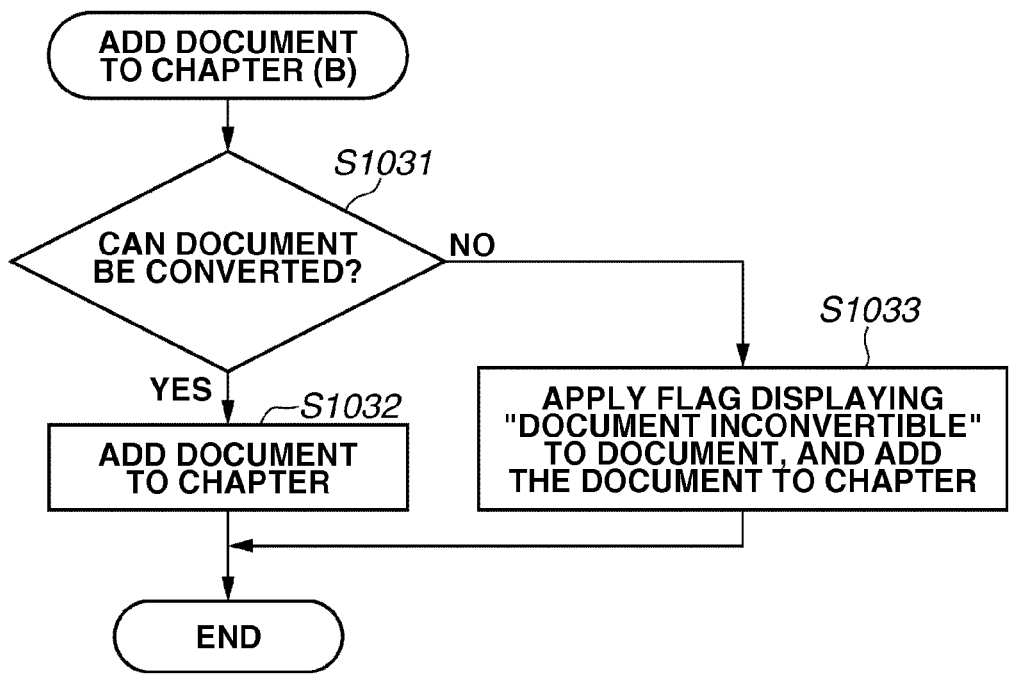
Figure 11A:
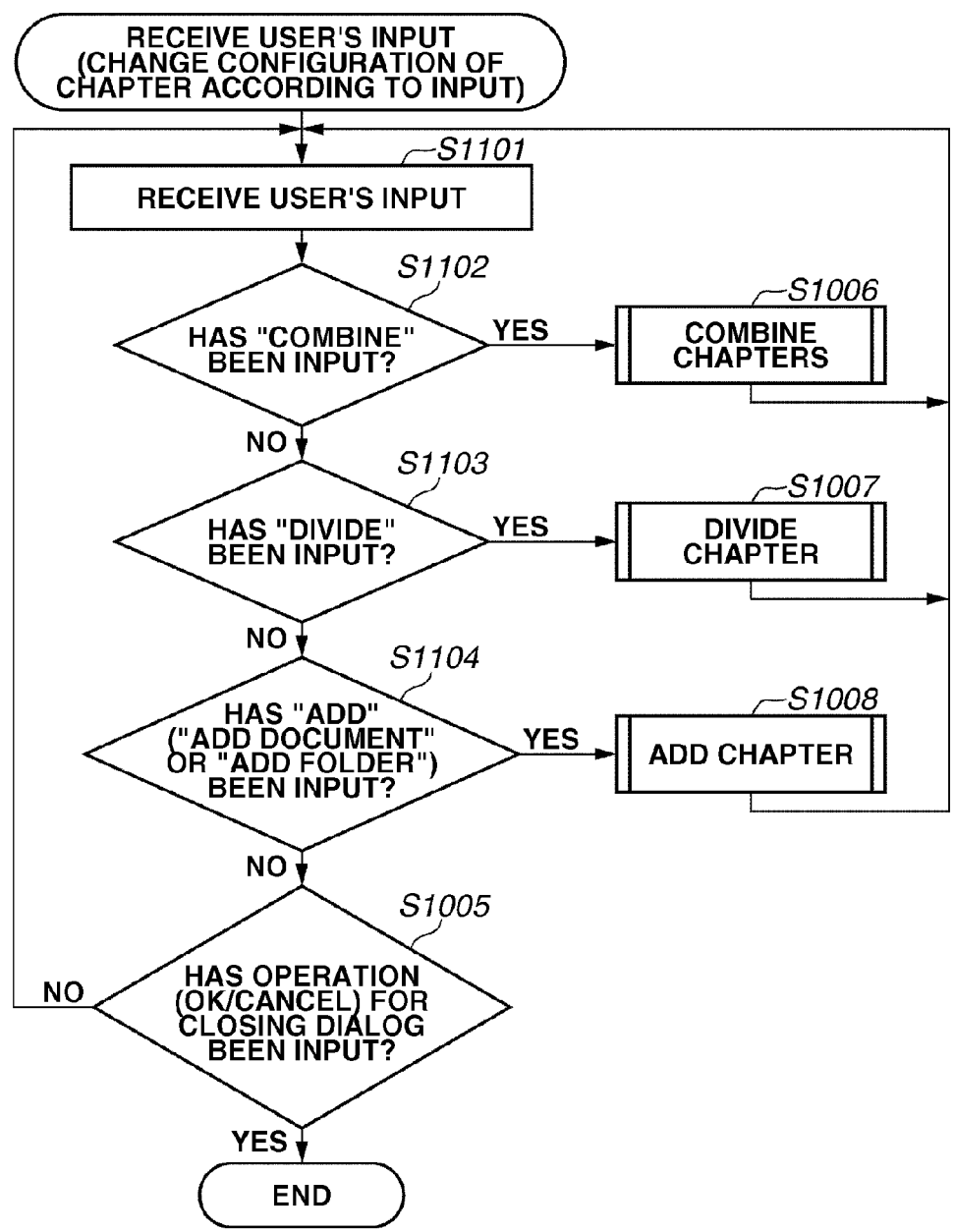
Figure 11D:
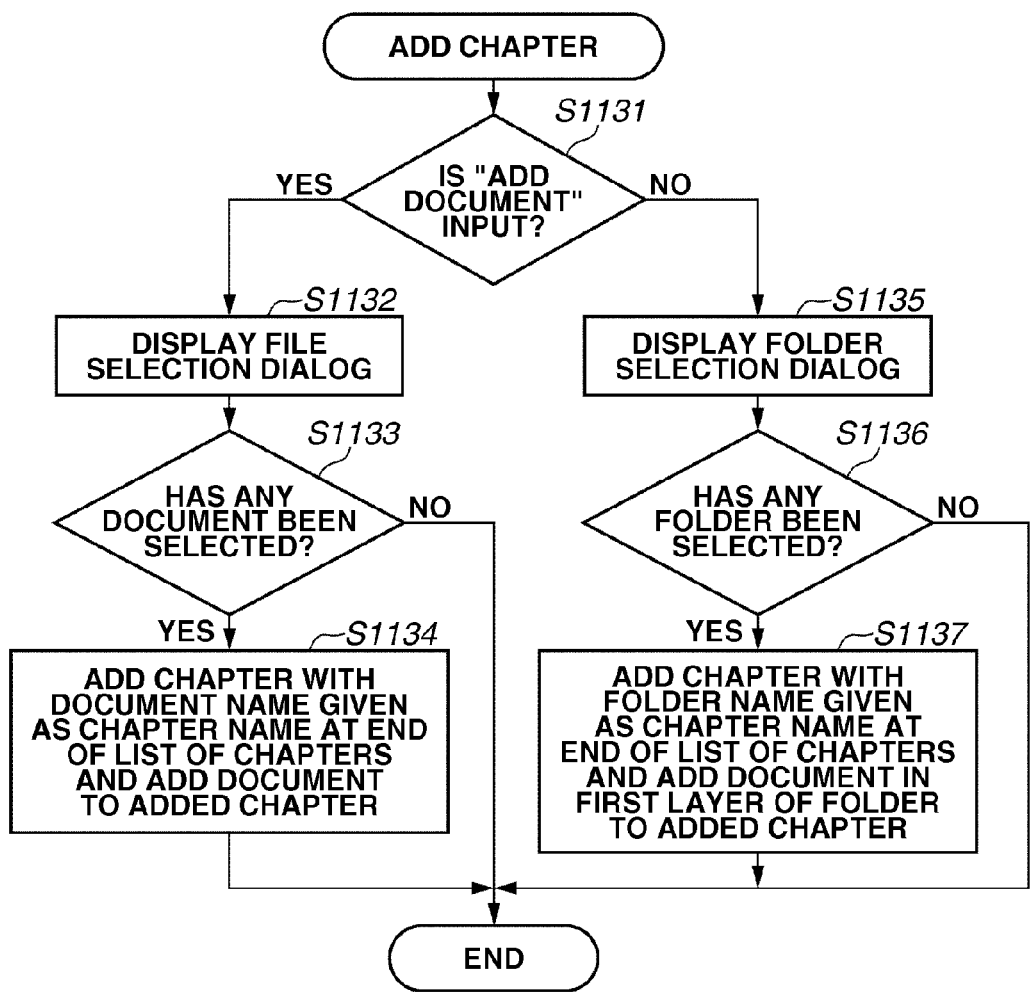
Figure 12:
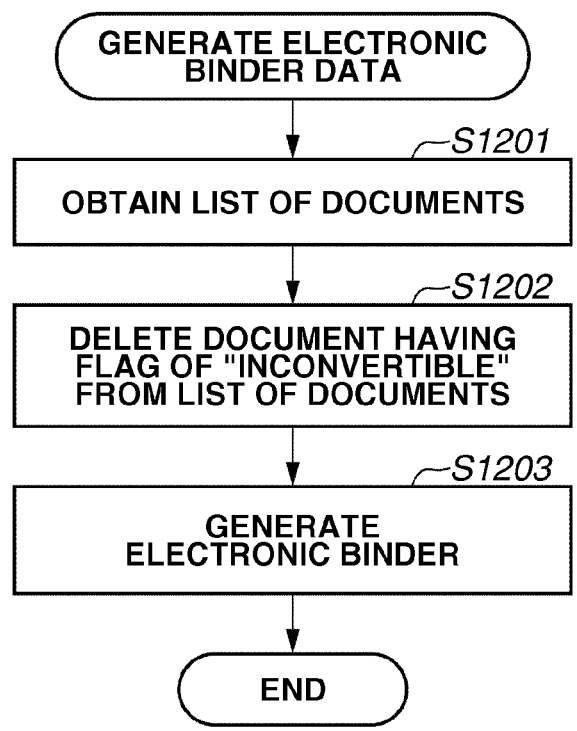
FIG. 12 illustrates a processing flow when the electronic binder is generated.

In step S801, the document processing control unit 402 determines whether to display the conversion setting dialog 702. FIG. 9 illustrates the determination processing flow. Details of the processing flow will be described below. In step S802, based on a determination result on whether to display the conversion setting dialog 702, the processing is branched. When it is determined that the conversion setting dialog 702 is to be displayed (YES in step S802), then in step S803, the document processing control unit 402 displays the conversion setting dialog 702 before the electronic binder is generated. FIGS. 10A, 10B, 10C, and 10D illustrate processing flows when the conversion setting dialog 702 is displayed. The details of the processing flows will be described below. Subsequently, the document processing control unit 402 receives a user's input for the conversion setting dialog 702, and performs the processing according to input content. FIGS. 11A, 11B, 11C, and 11D illustrate determination processing flows. The details of the processing flows will be described below. The conversion setting dialog 702 is ended when the user presses the OK button or a Cancel button. In step S805, the document processing control unit 402 identifies which button of the OK button and the Cancel button has been pressed. When an identification result is the OK button, in step S806, based on the changed setting, the electronic binder is generated, and the processing flow is ended. FIG. 12 illustrates a generation processing flow. The details of the processing flow will be described below. When the identification result is the Cancel button, the processing flow is ended. When it is determined that the conversion setting dialog 702 is not to be displayed (NO in step S802), then in step S806, the document processing control unit 402 generates the electronic binder based on a predetermined setting, and the processing flow is ended. When the identification result is an error (ERROR in step S802), then in step S807, the document processing control unit 402 displays an error message for warning that the document cannot be converted into the electronic binder, and the processing flow is ended.

[Processing Flow when Whether to Display Conversion Setting Dialog is Determined, when Electronic Documents are Converted into Electronic Binder]

FIG. 9 illustrates details of step S801 described above, in other words, illustrates a processing flow when whether to display the conversion setting dialog is determined, when the electronic binder application 400 converts the plurality of different electronic documents into the electronic binder. Steps S901 to S912 can be realized when the CPU 201 loads the electronic binder application 400 stored in the ROM 204 or the external memory 206 into the RAM 203 and executes it. First, in step S901, the document processing control unit 402 obtains a list of dropped items (document/folder) from the screen display management unit 404. Subsequently, in step S902, the document processing control unit 402 determines whether all items in the list are incapable of being converted. As a method for determining whether the item is incapable of being converted, for example, the extension of the document incapable of being converted is previously registered, and when the item to be determined has the extension corresponding to the registered extension, it is determined that the item cannot be converted. According to the present exemplary embodiment, the item having the extension of "exe" cannot be converted. When it is determined that the all items of the list are not incapable of being converted (NO in step S902), then in step S903, the document processing control unit 402 obtains a press state of a control key from the input management unit 403 to determine whether the control key is being pressed. When it is determined that the control key is not being pressed (NO in step S903), then in step S904, the document processing control unit 402 obtains information about a mouse from the input management unit 403 when it is dragged and dropped to determine whether the drag and drop is performed with a right button. When it is determined that the drag and drop has not been performed with the right button (NO in step S904), then in step S905, the document processing control unit 402 determines whether a single item has been dropped. When it is determined that the single item has not been dropped (NO in step S905), then in step S906, the document processing control unit 402 obtains the press states of sort keys (key 1, key 2, and key 3) from the input management unit 403 to determine whether the sort keys are being pressed. When it is determined that the sort keys are not being pressed (NO in step S906), then in step S907, the document processing control unit 402 determines whether the document name of the dropped items is formed of all numbers. When it is determined that the document name is not formed of all numbers (NO in step S907), then in step S908, the document processing control unit 402 determines to display the dialog, and the processing flow is ended. When it is determined that all items of the list are incapable of being converted (YES ins step S902), then in step S912, the document processing control unit 402 determines that the error (inconvertible into the electronic binder) has occurred, and the processing flow is ended. When it is determined that the control key is being pressed (YES in step S903), then in step S911, the document processing control unit 402 determines not to display the dialog, and the processing flow is ended. When it is determined that the drag and drop is performed with the right button (YES in step S904), then in step S908, the document processing control unit 402 determines to display the dialog, and the processing flow is ended. When it is determined that the single item has been dropped (YES in step S905), then in step S911, the document processing control unit 402 determines not to display the dialog, and the processing flow is ended. When it is determined that the sort key is being pressed (YES in step S906), then in step S909, the document processing control unit 402 sorts the items with the sort key corresponding to the pressed key. According to the present exemplary embodiment, the key 1 sorts the items by "name", the key 2 sorts the items by "update date and time", and the key 3 sorts the items by "size". The key can be arbitrarily associated with the sort key and the association method is not limited to the above-described method. Subsequently, in step S911, the document processing control unit 402 determines not to display the dialog, and the processing flow is ended. When the document name is formed of all numbers (YES in step S907), then in step S910, the document processing control unit 402 sorts the items in an order of the document names. In step S911, the document processing control unit 402 determines not to display the dialog, and the processing flow is ended. According to the present exemplary embodiment, the display of the dialog or the sort processing is switched according to the press state of the control key or the right button. However, according to the present exemplary embodiment, a trigger for switching the processing is not limited to the operation described above.

[Processing Flow when Conversion Setting Dialog is Displayed]

FIGS. 10A, 10B, 10C and 10D illustrate the details of step S803 described above. In other words, they illustrate the processing flows when the electronic binder application 400 displays the conversion setting dialog. In the processing flows, the electronic binder application 400 generates a list of chapters based on the list of the items. According to the present exemplary embodiment, when the item in the most upper layer of the list is a shortcut file, the document or the folder of the shortcut destination is added to the chapter. Steps S1001 to S1033 can be realized when the CPU 201 loads the electronic binder application 400 stored in the ROM 204 or the external memory 206 into the RAM 203, and executes it.

First, the processing flow illustrated in FIG. 10A will be described. This processing flow shows an entire processing flow when the conversion setting dialog is displayed. FIGS. 10B to 10D each illustrate a detailed flow of a step. First, in step S1001, the document processing control unit 402 selects one unprocessed item from among the list of the items as a process target. Subsequently, in step S1002, the document processing control unit 402 determines whether the item of the process target is a folder. When the item is a folder (YES in step S1002), then in step S1003, the document processing control unit 402 generates a new chapter with the folder name given as the chapter name, and adds the new chapter to the list of chapters. In step S1004, the document processing control unit 402 adds the document in the folder to the chapter. FIG. 10B illustrates the detailed processing flow of this processing. The details will be described below. In step S1006, the document processing control unit 402 checks whether any unprocessed item is included in the list of items. When the unprocessed item is included (YES in step S1006), the document processing control unit 402 repeatedly performs the processing in subsequent steps of step S1001. When the unprocessed item is not included (NO in step S1006), then in step S1007, the document processing control unit 402 displays the list of chapters via the conversion setting dialog, and the processing flow is ended. When the item is not a folder but a document (NO in step S1002), then in step S1005, the document processing control unit 402 adds the document to the chapter. FIG. 10C illustrates the detailed processing flow of this processing. The details will be described below. The processing in the subsequent steps of step S1006 is performed.

The processing flow illustrated in FIG. 10B will be described. FIG. 10B illustrates the details of step S1004 described above. In other words, FIG. 10B illustrates the processing flow when the document processing control unit 402 adds the document in the folder to the chapter. The present exemplary embodiment describes an example in which only the document in the first layer of the folder is added to the chapter. A second exemplary embodiment describes an example in which the document is added to the chapter with no limit of the layer provided. In step S1011, the document processing control unit 402 obtains the list of documents in the first layer of the folder. In step S1012, the document processing control unit 402 determines whether the obtained list is empty. When it is empty (YES in step S1012), the processing flow is ended. When it is not empty (NO in step S1012), then in step S1013, the document processing control unit 402 selects one unprocessed document from among the list of documents as the process target. In step S1014, the document processing control unit 402 adds the document of the process target to the chapter. FIG. 10D illustrates the detailed processing flow of this processing. The details will be described below. In step S1015, the document processing control unit 402 determines whether the unprocessed document is included in the list of documents. When it is included (YES in step S1015), the processing in the subsequent steps of the step S1013 is repeatedly performed. When it is not included (NO in step S1015), the document processing control unit 402 ends the processing flow.

The processing flow illustrated in FIG. 10C will be described. FIG. 10C illustrates the details of step S1005 described above. In other words, FIG. 10C illustrates the processing flow when the document processing control unit 402 adds the document to the chapter. According to this processing flow, when the document is a shortcut file, the document or the folder of the shortcut destination is added to the chapter. In step S1021, the document processing control unit 402 determines whether the document is a shortcut file. When it is a shortcut file (YES in step S1021), then in step S1022, the document processing control unit 402 determines whether the shortcut destination exists. When the shortcut destination exists (YES in step S1022), then in step S1023, the document processing control unit 402 determines whether the shortcut destination is a folder. When the shortcut destination is a folder (YES in step S1023), then in step S1024, the document processing control unit 402 generates a new chapter with the folder name of the shortcut destination given as the chapter name, and adds the new chapter to the list of chapters. Subsequently, in step S1025, the document processing control unit 402 adds the document in the folder to the chapter, and ends the processing. The processing in step S1025 is performed in a similar manner to the processing flow illustrated in FIG. 10B. When it is determined that the document is not the shortcut file (NO in step S1021), then in step S1027, the document processing control unit 402 adds the document to the chapter, and ends the processing flow. FIG. 10D illustrates the detailed processing flow of step S1027. The details will be described below. When it is determined that the shortcut does not exist (NO in step S1022), then in step S1028, the document processing control unit 402 generates a new chapter with the shortcut file name and "the shortcut destination is not found" given as the chapter name, and adds the new chapter to the list of chapters. With such a chapter name, the user can know that no shortcut destination exists. The processing in the subsequent steps of step S1027 will be performed. When it is determined that the shortcut destination is not a folder (NO in step S1023), then in step S1026, the document processing control unit 402 generates a new chapter with the document name of the document of the shortcut destination given as the chapter name, and adds the new chapter to the list of chapters. The processing in the subsequent steps of step S1027 will be performed.

The processing flow illustrated in FIG. 10D will be described. FIG. 10D illustrates the details of steps S1014 and S1027 described above. In other words, FIG. 10D illustrates the processing flow when the document processing control unit 402 adds the document to the chapter. In this processing flow, unlike the processing flow illustrated in FIG. 10C, when the document is a shortcut file, the shortcut file is treated as the document that cannot be converted into the electronic binder. In step S1031, the document processing control unit 402 determines whether the document can be converted into the electronic binder document. As described above, according to the present exemplary embodiment, the document having the extension of "exe" can be converted into the electronic binder. In addition, the shortcut file cannot be converted either. When the document can be converted into the electronic binder (YES in step S1031), then in step S1032, the document processing control unit 402 adds the document to the chapter, and ends the processing flow. When the document cannot be converted into the electronic binder (NO in step S1031), then in step S1033, the document processing control unit 402 applies to the document a flag displaying that the document is inconvertible and adds the document to the chapter, and ends the processing flow.

[Processing Flow when Conversion Setting is Changed via Conversion Setting Dialog]

Figure 13A:
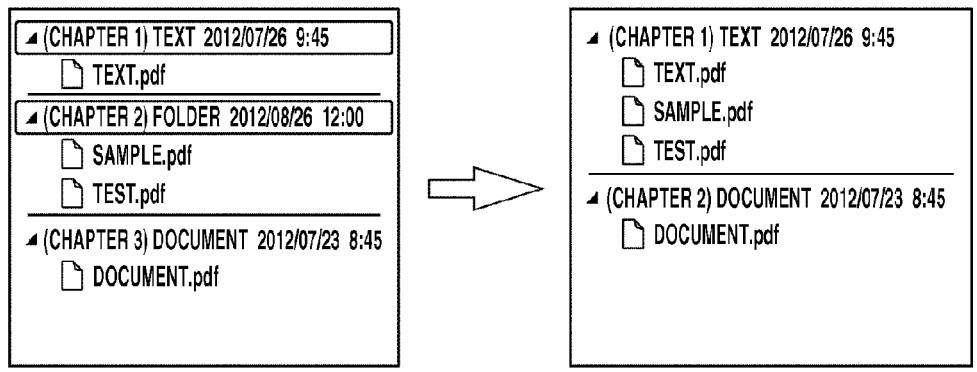
FIGS. 13A, 13B, and 13C illustrate examples of the UI display when the conversion setting is changed via the conversion setting dialog.
Figure 13B:
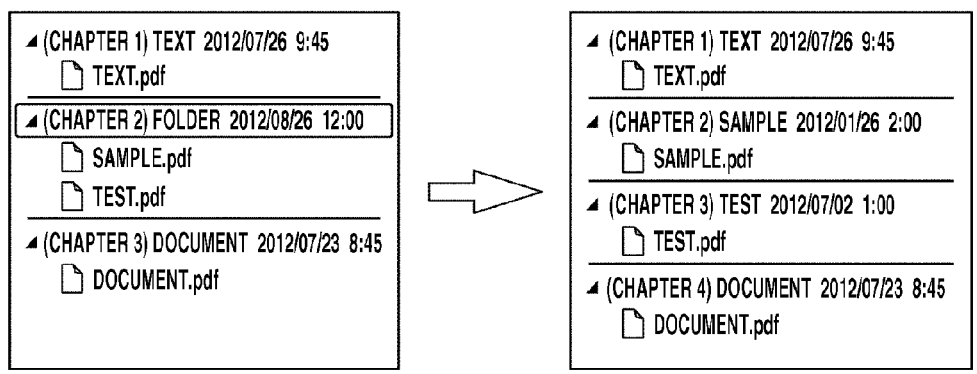
Figure 13C:
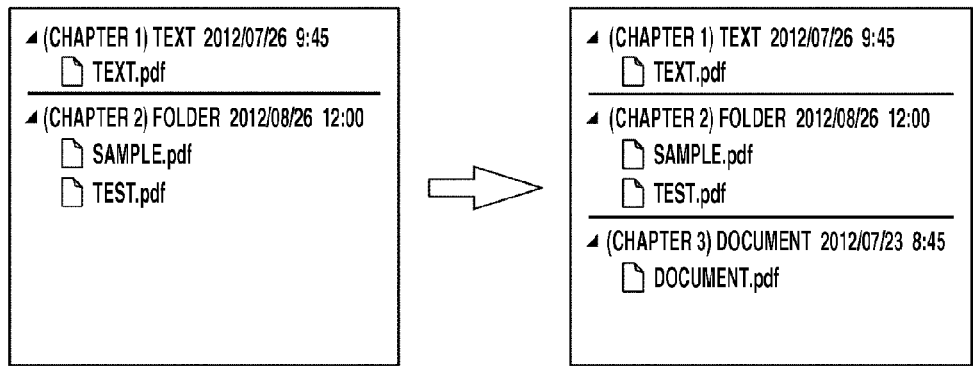

FIGS. 11A, 11B, 11C, and 11D illustrate the details in step S804 described above. In other words, they illustrate the processing flows when the electronic binder application 400 changes the conversion setting via the conversion setting dialog. Via the conversion setting dialog, to perform the conversion setting, the user can perform "combining", "dividing", and "adding" operations of the chapters. FIGS. 13A, 13B, and 13C illustrate examples when the "combining", "dividing", and "adding" operations of the chapters are performed. FIG. 13A is the example when the combining operation of the chapters is performed. When the combining of the chapters is performed with a "text" chapter and a "folder" chapter selected, the document in the "folder" chapter is added to the "text" chapter, and the "folder" chapter is deleted. FIG. 13B is the example when the dividing operation of the chapter is performed. When the dividing of the chapter is performed with the "folder" chapter selected, the documents in the "folder" chapter of "sample.pdf" and "test.pdf" are divided into independent chapters. More specifically, a "sample" chapter including "sample.pdf" and a "test" chapter including "test.pdf" are generated, and a "folder" chapter is deleted. FIG. 13C illustrates an example when the adding operation of the chapter is performed. This example shows the adding operation of a "docuemnt.pdf" document. At this point, a "document" chapter including "document.pdf" is generated at an end of the list of chapters.

Steps S1101 to S1137 can be realized when the CPU 201 loads the electronic binder application 400 stored in the ROM 204 or the external memory 206 into the RAM 203, and executes it.

The processing flow illustrated in FIG. 11A will be described. This processing flow indicates an entire processing flow of the electronic binder application 400 when the user's input is received. FIGS. 11B, 11C, and 11D each illustrate a detailed flow of a step. First, in step S1101, the document processing control unit 402 receives the user's input from the input management unit 403. In step S1102, the document processing control unit 402 determines whether the received input is "combining". When the received input is not "combining" (NO in step S1102), then in step S1103, the document processing control unit 402 determines whether the received input is "dividing". When the received input is not "dividing" (NO in step S1103), then in step S1104, the document processing control unit 402 determines whether the received input is "adding". The input of "adding" herein includes "adding the document" and "adding the folder". When the received input is not "adding (NO in step S1104), then in step S1105, the document processing control unit 402 determines whether the received input is an operation (OK or Cancel) of closing the dialog. When the received input is the operation of closing the dialog (YES in step S1105), the processing flow is ended. When the received input is not the operation of closing the dialog (NO in step S1105), the processing in the subsequent steps of step S1101 are repeatedly performed. When the received input is "combining" (YES in step S1102), then in step S1106, the document processing control unit 402 performs the combining of the chapters. FIG. 11B illustrates the detailed processing flow of this processing. The details will be described below. The processing in the subsequent steps of step S1101 is performed. When the received input is "dividing" (YES in step S1103), then in step S1107, the document processing control unit 402 performs the dividing of the chapter. FIG. 11C illustrates the detailed processing flow of this processing. The details will be described below. The processing in the subsequent steps of step S1101 is performed. When the received input is "adding" (YES in step S1104), then in step S1108, the document processing control unit 402 performs the adding of the chapter. FIG. 11D illustrates the detailed processing flow of this processing. The details will be described below. The processing in the subsequent steps of step S1101 will be performed.

The processing flow illustrated in FIG. 11B will be described. FIG. 11B illustrates the details of step S1106 described above. In other words, FIG. 11B illustrates the processing flow when the document processing control unit 402 performs the combining of the chapters. In step S1111, the document processing control unit 402 checks whether a plurality of chapters is selected. When the plurality of chapters is not selected (NO in step S1111), the processing flow is ended. When the plurality of chapters is selected (YES in step S1111), then in step S1112, the document processing control unit 402 adds the document in the chapter other than the highest chapter of the selected chapters to the highest chapter. Subsequently, in step S1113, the document processing control unit 402 deletes the chapter other than the highest chapter of the selected chapters, and ends the processing flow.

The processing flow illustrated in FIG. 11C will be described. FIG. 11C illustrates the details of step S1107 described above. In other words, FIG. 11 illustrates the processing flow when the document processing control unit 402 performs the dividing of the chapter. In step S1121, the document processing control unit 402 checks whether any chapter is selected. When no chapter is selected (NO in step S1121), the processing flow is ended. When the chapter is selected (YES in step S1121), then in step S1122, the document processing control unit 402 defines one unprocessed chapter of the selected chapters as the process target. In step S1123, the document processing control unit 402 checks whether any document is included in the chapter of the process target. When no document is included (NO in step S1123), the processing in the subsequent steps of step S1122 is performed. When the document is included (YES in step S1123), then in step S1124, the document processing control unit 402 defines one unprocessed document of the selected chapters as the process target. In step S1125, the document processing control unit 402 adds at a chapter's location the chapter with the document name given as the chapter name, and adds the document to the added chapter. In step S1126, the document processing control unit 402 checks whether the unprocessed document is included in the documents in the chapter. When the unprocessed document is included (YES in step S1126), the document processing control unit 402 performs the processing in the subsequent steps of step S1124. When no unprocessed document is included (NO in step S1126), then in step S1127, the document processing control unit 402 checks whether the unprocessed chapter is included in the selected chapters. When the unprocessed document is included (YES in step S1127), the document processing control unit 402 performs the processing in the subsequent steps of step S1122. When no unprocessed document is included (NO in step S1127), then in step S1128, the document processing control unit 402 deletes the selected chapter.

The processing flow illustrated in FIG. 11D will be described. FIG. 11D illustrates the details of step S1108 described above. In other words, FIG. 11D illustrates the processing flow when the document processing control unit 402 adds the chapter. In step S1131, the document processing control unit 402 determines whether "add document" is input. When "add document" is input (YES in step S1131), then in step S1132, the document processing control unit 402 displays a file selection dialog on the display unit 202 via the screen display management unit 404. In step S1132, the document processing control unit 402 determines whether the document has been selected via the file selection dialog. When no document has been selected (NO in step S1133), the processing flow is ended. A case where no document has been selected includes a case where a Cancel button is pressed via the dialog. When the document has been selected (YES in step S1133), then in step S1134, the document processing control unit 402 adds the chapter with the document name given as the chapter name at an end of the list of chapters, and adds the document to the added chapter, and the processing flow is ended. When "add document" is not input (when "add folder" is input) (NO in step S1131), then in step S1135, the document processing control unit 402 displays a folder selection dialog. In step S1136, the document processing control unit 402 determines whether the folder has been selected via the folder selection dialog. When no folder has been selected (NO in step S1136), the processing flow is ended. When the folder has been selected (YES in step S1136), then in step S1137, the document processing control unit 402 adds the chapter at the end of the list of chapters with the folder name given as the chapter name, the document in the first layer of the folder is added to the added chapter, and the processing flow is ended.

[Processing Flow when Electronic Binder Data is Generated]

FIG. 12 illustrates the detail of step S806 described above. In other words, FIG. 12 illustrates the processing flow when the electronic binder application 400 generates the electronic binder data. Steps S1101 to S1128 can be realized when the CPU 201 loads the electronic binder application 400 stored in the ROM 204 or the external memory 206 into the RAM 203, and executes it. In step S1201, the document processing control unit 402 obtains the list of documents. In step S1202, from among the list of documents, the document processing control unit 402 deletes the document having the flag displaying "inconvertible". Finally, in step S1203, the document processing control unit 402 generates the electronic binder.

As described above, before one integrated electronic document is generated from a plurality of material electronic documents, a setting screen is displayed via which an order of the documents can be moved in a unit of the material electronic document and a chapter structure can be set, thereby improving the operability.

As for the generated integrated electronic document, by an editing function of the electronic binder application 400, the setting on the chapter structure and the setting on the order of pages can be changed.

The first exemplary embodiment describes the example in which, when the conversion setting dialog is displayed, the electronic binder application 400 adds only the document in the first layer of the selected folder to the chapter. The second exemplary embodiment describes the example in which, to further improve the user's convenience, the document is added to the chapter, with no limit of the layer provided. Difference from the first exemplary embodiment in the processing of the electronic binder application 400 according to the present exemplary embodiment will be described below with reference to a flowchart illustrated in FIG. 14. Each processing flow according to the present exemplary embodiment can be realized when the CPU 201 loads the electronic binder application 400 or a printer driver stored in the ROM 204 or the external memory 206 into the RAM 203, and executes it. Further, if not otherwise specified, the electronic binder application 400 according to the present exemplary embodiment has the same configuration as that of the first exemplary embodiment.

FIG. 14 illustrates the details of step S803 described above. In other words, FIG. 14 illustrates the processing flow when the electronic binder application 400 displays the conversion setting dialog. In step S1401, the document processing control unit 402 selects one unprocessed item from among the list of items as the process target. In step S1402, the document processing control unit 402 determines whether the item of the process target is a folder. When the item is a folder (YES in step S1402), then in step S1403, the document processing control unit 402 generates a new chapter with the folder name given as the chapter name and adds the new chapter to the list of chapters. In step S1404, the document processing control unit 402 performs the processing illustrated in FIG. 10D on all documents in the folder. In step S1406, the document processing control unit 402 checks whether the unprocessed item is included in the list of items. When the unprocessed item is included (YES in step S1406), the document processing control unit 402 repeatedly performs the processing in the subsequent steps of step S1401. When no unprocessed item is included (NO in step S1406), then in step S1407, the document processing control unit 402 displays the list of chapters via the conversion setting dialog, and the processing flow is ended. When the item is not a folder but a document (NO in step S1402), then in step S1405, the document processing control unit 402 performs the processing illustrated in FIG. 10D on the document. The processing in the subsequent steps of step S1406 is performed.

By the processing described above, the user can convert the all document in the selected folder into the electronic binder, thereby improving the convenience.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-248309 filed Nov. 12, 2012, which is hereby incorporated by reference herein in its entirety.

What is claimed is:

1. An information processing apparatus comprising:
a memory storing a computer program; and
at least one processor executing the computer program in the memory to control the information processing apparatus to function as units comprising:
a reception unit configured to receive specification of a plurality of items and an instruction for generation of an integrated electronic document based on the plurality of items, wherein the plurality of items include a file and a folder which includes a plurality of files;
a display unit configured to, when the reception unit receives the instruction, display on a display a setting screen for receiving setting for a chapter structure of the integrated electronic document and setting for an order of material electronic documents;
wherein, if one of the plurality of items is a first folder, the display unit displays, as a chapter of the chapter structure of the integrated electronic document displayed in the setting screen, a chapter to which a name of the first folder is given and further displays, as a plurality of material electronic documents included in the displayed chapter to which the name of the first folder is given, first files included in the first folder, and
wherein, if one of the plurality of items is a second file, the display unit displays, as one chapter of the chapter structure of the integrated electronic document displayed in the setting screen, a chapter to which a name of the second file is given and further displays the second file as a material electronic document included in the displayed chapter to which the name of the second file is given, and
wherein the setting for the chapter structure of the integrated electronic document and the setting for the order of material electronic documents are instructed in a unit of material electronic document, and
a generation unit configured to generate the integrated electronic document based on the settings received via the setting screen.

2. The information processing apparatus according to claim 1, wherein the reception unit is configured to, in response to detection of a drop action of the plurality of items, determine to receive a specification of the plurality of items and an instruction for generation of an integrated electronic document based on the plurality of items.

3. The information processing apparatus according to claim 1, further comprising a determination unit configured to determine whether to display the setting screen when the reception unit receives the instruction,
wherein the generation unit is configured to generate the integrated electronic document based on the settings received via the setting screen when the determination unit determines to display the setting screen, and to generate the integrated electronic document based on a predetermined setting when the determination unit determines not to display the setting screen.

4. The information processing apparatus according to claim 3, wherein the determination unit is configured to determine whether to display the setting screen based on a press state of a mouse and a key when the instruction is received and an attribute of the material electronic document.

5. An information processing method comprising:
receiving specification of a plurality of items and an instruction for generation of an integrated electronic document based on the plurality of items, wherein the plurality of items include a file and a folder which includes a plurality of files;
displaying, when the instruction is received, on a display unit, a setting screen for receiving setting for a chapter structure of the integrated electronic document and setting for an order of material electronic documents;
wherein, if one of the plurality of items is a first folder, the setting screen displays, as a chapter of the chapter structure of the integrated electronic document, a chapter to which a name of the first folder is given and further displays, as a plurality of material electronic documents included in the displayed chapter to which the name of the first folder is given, first files included in the first folder, and
wherein, if one of the plurality of items is a second file, the setting screen displays, as one chapter of the chapter structure of the integrated electronic document, a chapter to which a name of the second file is given and further displays the second file as a material electronic document included in the displayed chapter to which the name of the second file is given, and
wherein the setting for the chapter structure of the integrated electronic document and the setting for the order of material electronic documents are instructed in a unit of material electronic document, and
generating the integrated electronic document from the plurality of material electronic documents based on the setting received via the setting screen.

6. The information processing method according to claim 5, further comprising determining to receive a specification of the plurality of items and the instruction for generation of an integrated document based on the plurality of items in response to detection of a drop action of the plurality of items.

7. The information processing method according to claim 5, further comprising:
determining whether to display the setting screen when the instruction is received;

generating the integrated electronic document based on the settings received via the setting screen when displaying the setting screen is determined, and generating the integrated electronic document based on a predetermined setting when not displaying the setting screen is determined.

8. The information processing method according to claim 7, wherein determining whether to display the setting screen is executed based on a press state of a mouse and a key when the instruction is received and an attribute of the material electronic document.

9. A non-transitory computer-readable storage medium storing a program that causes a computer to perform:

receiving specification of a plurality of items and an instruction for generation of an integrated electronic document based on the plurality of items, wherein the plurality of items include a file and a folder which includes a plurality of files;

displaying, when the instruction is received, on a display unit, a setting screen for receiving setting for a chapter structure of the integrated electronic document and setting for an order of material electronic documents, wherein, if one of the plurality of items is a first folder, the setting screen displays, as a chapter of the chapter structure of the integrated electronic document, a chapter to which a name of the first folder is given and further displays, as a plurality of material electronic documents included in the displayed chapter to which the name of the first folder is given, first files included in the first folder, and wherein, if one of the plurality of items is a second file, the setting screen displays, as one chapter of the chapter structure of the integrated electronic document, a chapter to which a name of the second file is given and further displays the second file as a material electronic document included in the displayed chapter to which the name of the second file is given, and wherein the setting for the chapter structure of the integrated electronic document and the setting for the order of material electronic documents are instructed in a unit of material electronic document; and generating the integrated electronic document based on the settings received via the setting screen.

* * * * *